DIGITAL STORAGE SYSTEMS UTILIZING A STACK OF ENCODED CONDUCTORS

Filed Sept. 26, 1966 3 Sheets-Sheet 1

HOWARD A. DOREY
INVENTOR

April 21, 1970 H. A. DOREY 3,508,217

DIGITAL STORAGE SYSTEMS UTILIZING A STACK OF ENCODED CONDUCTORS

Filed Sept. 26, 1966 3 Sheets-Sheet 2

United States Patent Office 3,508,217
Patented Apr. 21, 1970

3,508,217

DIGITAL STORAGE SYSTEMS UTILIZING A STACK OF ENCODED CONDUCTORS

Howard Anthony Dorey, Godalming, England, assignor to The Solartron Electronic Group Limited, Farnborough, England, a corporation of the United Kingdom Filed Sept. 26, 1966, Ser. No. 581,995
Claims priority, application Great Britain, Sept. 28, 1965, 41,221/65
Int. Cl. G11c *11/06, 5/02, 17/00*
U.S. Cl. 340—174 6 Claims

ABSTRACT OF THE DISCLOSURE

In accordance with one embodiment of this invention, a blank for a memory or information storage system and a system formed by a stack of such blanks is disclosed. The blank comprises an insulating board having a row of apertures therein and mounts an electrically conductive pattern. The conductive pattern links a core disposed in each aperture in one directional sense to provide a binary 1 and in an opposite directional sense to provide a binary 0 whereby greater discrimination is typically realized. The pattern includes a conductive loop about each aperture and two elongated electrical conductors extend along different sides of the row of apertures, the two conductors being spaced from the conductive loops. At least one, and preferably two, spaced apart, electrically conductive strips extend laterally from each conductor toward one aperture to electrically connect each loop to a corresponding one of the conductors.

This invention relates generally to digital-information storage systems and, more particularly, to digital-information storage systems of the permanent storage type in which the information stored in the system depends upon the construction of the system store.

Permanent-type digital information storage systems usually have a number of input or interrogation circuits, and a number of outputs or response circuits. On being interrogated by signal pulses applied to one interrogation circuit or a combination of interrogation circuits, the store provides output signals in a predetermined combination of response circuits according to the information stored. The information read from the store is in digital form since a number of discrete pulses are induced in various response windings. Each of these pulses corresponds to what is known as a binary digit or "bit" of information and a combination of bits forms a binary "word."

Where the pulses supplied to the interrogation circuits correspond to the address or identifying label for the information provided by the output signals, it is often useful to be able to supply an item of information to the store and obtain addresses corresponding to that item. It is a disadvantage of known stores that the functions of the interrogation and response circuits are not interchangeable as they must be if the above-mentioned process of obtaining addresses for an item of information is to be carried out.

A difficulty is encountered in making permanent stores at an economical price which can be altered easily to change the information stored therein. This is particularly so where the information is to be frequently changed after installation. For instance, boards carrying wires and diodes are sometimes used to store information, and it is often necessary to strip a board almost completely to change one "word," that is, one item of stored information.

As an another example of the desirability of being able to change stored information, an apparatus may have a number of alarm conditions, a combination of which indicates that it is not working correctly. Signals representative of the alrm conditions may be passed to the permanent store, and if these signals are in the correct combination, an alarm signal is produced which may stop or alter the mode of working of the apparatus. In the light of experience it may, however, be necessary or desirable to alter the combinations of the alarm conditions giving rise to alterations in the mode of apparatus operation. This can best be carried out by changing the information in the store. It is clearly desirable therefore that such changes should be made easily, quickly and accurately.

An object of the present invention therefore is to provide a permanent store in which the items of information stored can be changed quickly and accurately.

Another object of the present invention is to provide a permanent store in which the interrogation and response circuits are interchangeable, at will.

Yet another object of the present invention is to provide a store which, while achieving the above objects, is simple and economical to construct.

In its broader aspects, the instant invention contemplates a permanent digital-information store which includes a plurality of cores of magnetic material, each having an electrical winding mounted thereon and plurality of electrical conductors, each conductor completely looping selected cores but not others according to a word of information to be stored by each conductor. Interrogation circuits are employed for exciting at least one of the core windings whereby information is obtained from the store by inducing an output signal in at least one other of the core windings, depending on the routing of the individual conductors. Response circuits are additionally employed for indicating when signals are induced in said other core winding or core windings.

In accordance with the more specific aspects of this invention, the conductors of the store are electrically conducting sheets or laminae and a number of words is stored by a stack of such laminae. The address in the store of the information stored by each lamina is also stored by the lamina. The cores associated with the conductors are rods of magnetically permeable material, one rod of each bit making up the address and the information stored. Each lamina may then be so shaped that the rods can be passed through the stack and where the lamina loops a rod one of two alternative bits (a 0 bit or a 1 bit) is stored or where the lamina by-passes a rod the other bit (a 1 bit or a 0 bit) is stored. A current direction limiting device may be connected in series with the loop formed by each lamina to inhibit certain currents in the lamina and thereby facilitate reading from the store.

In the store of this invention certain core windings may be allocated as interrogation windings and other core windings allocated as response windings. A pulse in an interrogation winding or a combination of interrogation windings induces, by way of one of the conductors, a pulse in a predetermined response winding or combination of response windings. Conversely, the response windings can equally well be pulsed to induce pulses in the interrogation windings. Therefore, the difference between response and interrogation windings is merely a matter of allocation of interrogation signal input and an extremely flexible store is thusly provided.

To illustrate this facet of the invention, assume that given combinations of interrogation windings represent the location of a book in a library and the corresponding combinations of response windings represent the classified contents of the book. In addition to being able to find what the books at any given location contain by pulsing the interrogation winding, all books with contents relating to a certain subject can be found by pulsing the response windings and interpreting the induced pulses in the interrogation windings.

Thus, if the information represented by a combination of response windings is known, the corresponding combination interrogation windings (that is the address of the information) can be found. If no such address exists and it is required to known the address with the most identical bits, the magentic flux linking the response winding with the conductors may be increased until a combination of interrogation windings is excited. This can be understood when it is realized that where a number of windings are pulsed output pulses are obtained from other windings only when the resulting current in the conductor looping those other windings reaches a certain magnitude, the currents in other conductors which only loop some of the pulsed windings being weaker or of opposite sign.

When it is required to carry out cross-referencing between conductors or other stores according to the invention, the information stored by one conductor may be read out, and this information may be fed to the response windings of the store or other stores, so obtaining the address of conductors storing the same information or similar information. Certain parts of the stores used in cross-referencing, for example windings corresponding to certain bits, may be inhibited so that similarities in details of information stored can be found.

The cores may be rods of magnetic material and the conductors, as alluded to above, are preformed to represent certain words of information, with the attendant advantage that information can easily be changed by changing preformed conductors. Fewer mistakes are likely to occur with this arrangement than if a change of routing of an ordinary flexible conductor were to be attempted.

The invention will now be described, by way of example, with reference to the accompanying drawings in which.

In constructing the store of this invention, a plurality of rods of magnetic material and of rectangular cross-section may be used, the rods passing through rectangular holes and slots in an entry blank of the type described briefly above, and allowing a stacking of the entry blanks. The rods are physically aligned and a series of corresponding parallel rods of magnetic material carrying the interrogating and response windings are fixed to the first-mentiond rod by capping pieces which are also composed of magnetic material and are detachably mounted on the ends of each pair of rods to form rectangular magnetic circuit with no air gaps.

Figure 1:
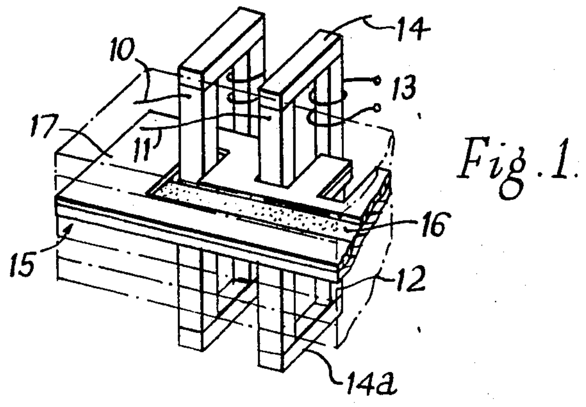
FIG. 1 is a perspective of part of a permanent store that is constructed in accordance with this invention and depicts in detail a typical entry blank and associated core rods.

Referring to FIG. 1, for a more complete understanding of the permanent store of this invention, rods 10 and 11 are representative of a number of such rods, the remainder not being shown, which are arranged in line in the store. Each rod forms part of a magnetic circuit including, in the case of rod 11, a further rod 12 carrying a winding 13 and two capping pieces 14 and 14*a*. The rods and capping pieces of the camplete store are composed of linear ferromagnetic material and each pair of capping pieces 14 and 14*a* is preferably detachably mounted on the ends of each pair of associated rods.

To enter a word in the store, an entry blank 15, preformed or shaped according to the binary value of the word, is threaded over the rods not carrying windings by removing the capping pieces at the one end of these rods. Some rods will thread through the shaped entry blank but others will be located in open slots in the blank as is shown in FIG. 1. To enter each word into the store a separate entry blank is used, and in this way a stack of blanks is formed, as indicated by the phantom lines in FIG. 1. The word stored can be easily changed by changing entry blanks.

Figure 2:
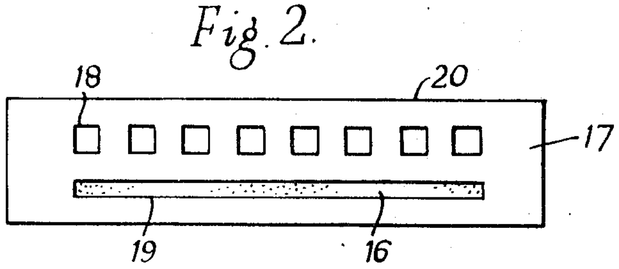
FIG. 2 shows a plan view of a blank which is modified in accordance with the principles of this invention to form an entry blank.

An unshaped entry blank is shown in FIG. 2 and comprises a thin, rigid board 16 of electrical insulative material such as resin-bonded fibreglass, with a coextensive sheet 17 of an electrically conductive metal, such as copper, fixed to one surface of the insulative board 16 by, for example, an adhesive. A number of rectangular holes 18 are arranged in line in the board 16 and in the sheet 17, and a strip 19 of the board 16 not covered by the copper sheet 17 runs parallel to one side of the blank. The number of holes 18 is generally equal to the number of magnetic cores and the holes 18 are preferably located equidistant between an adjacent end of the strip 19 and the edge 20 of the blank to facilitate the selective removal of conductive metal either from between a hole 18 and the edge 20 or from between a hole 18 and the adjacent edge of the strip 19.

When a blank is to be shaped to form an entry blank, the board 16 and copper sheet 17 may be cut-away adjacent to each hole in one of two ways. If a rod (such as the rod 10, FIG. 1) is to pass through the leftmost hole in the entry blank, FIG. 2, the materal between the strip 19 and this hole is removed, but if the rod (such as rod 11, FIG. 1) is to be in a slot, then the conductive metal between the associated hole and the edge 20 is removed.

The blank may be cut to the required shape using a cutting tool (not shown) which has a set of jaws with a shearing cross-section of substantially the same size and shape as each hole 18. Each set of jaws can be set to remove either the material between a hole 18 and the strip 19 to produce, for instance, a 1 bit in an interrogation or response code or between the hole and the edge 20 of the strip 19 to produce, for instance, a 0 bit in the interrogation or response code.

Figure 3:
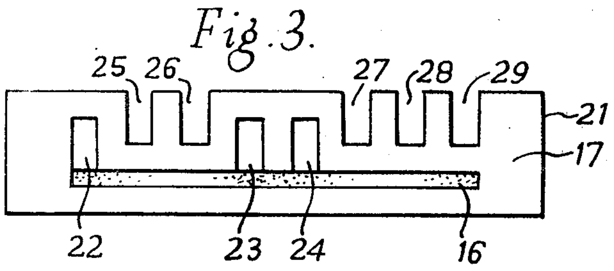
FIG. 3 shows a plan view of one embodiment of an entry blank constructed in accordance with this invention.

As an example of the operation of the store shown partially in FIG. 1, an entry blank 21, shaped as shown in FIG. 3, is inserted into the store. The copper sheet or lamina 17 forms a conductor that "loops" the rod passing through holes 22, 23, and 24, but that by-passes the rods which would extend upwardly through slots 25 to 29. The terms "loop" or "looping," as used in this specification in describing the relation of a conductor and a core, mean that the conductor passes around the core in one direction only, to form a continuous electrical circuit or conductive path.

A pulse on the winding associated with the rod that threads through the hole 22 will induce a current in the conductor which in turn will induce pulses in the windings associated with the rods that thread through the holes 23 and 24. The slots 25 to 29 are converted from holes 18 to prevent short circuited turns being present and causing opposing currents in the conductor.

Each entry blank is required to produce a specific output word or code of pulses in response to a given interrogation code of pulses, that is, the interrogation pulses must be able to select any one of the entry blanks and thus a code of output pulses.

In practice it is useful to be able to interrogate using several interrogation windings at once. For this purpose the windings and associated rods are allocated as interrogation or response windings and rods.

To select a particular entry blank, a code of flux pulses is induced in the interrogation rods by way of electrical pulses applied to their associated windings. These flux pulses are of positive polarity for 1 bits in the code or, in the case of 0 bits in the code, of negative polarity of such magnitude that the presence of a 0 bit in one binary word will always give a negative current in entry blanks other than the blank to be selected. For example, a word of a five bit code would have two 1 bits and three 0 bits, the magnitude of the flux representing a 0 bit being greater than magnitude of the flux representing each 1 bit. Such a code would be capable of selecting one of ten entry blanks. In this example, to select a particular entry blank linking two particular rods, these rods would be positively pulsed and the other rods would be negatively pulsed at more than the positive pulse magnitude. A positive current (corresponding to the sum of two positive fluxes) would flow in one conductor, and negative currents would flow in the other nine conductors looping two rods. To select a blank it is merely necessary to distinguish between a positive current and a negative current.

Figure 4:
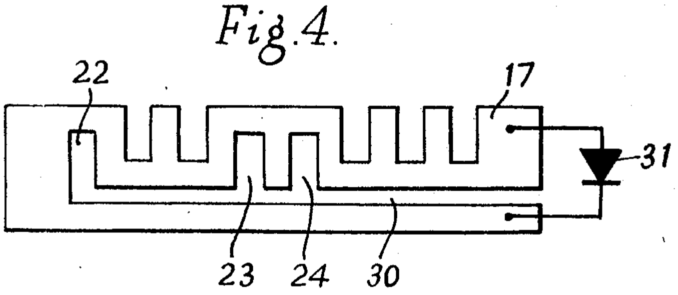
FIG. 4 is a plan view of another embodiment of an entry blank.

With certain classes of code, if the response windings are connected to unidirectional current detectors, then the necessary distinction may be achieved. Instead, for more general classes of code, currents may be allowed to flow in one direction only in the blanks by using, for instance, thin film or conventional diodes. The arrangement of a blank using a diode is shown schematically in FIG. 4. Here the copper sheet 17 covers the entire plastic board, and a slot 30 that is cut through the entry blank replaces the insulated strip 19. Alternatively, the strip 19 may extend to one edge of the board 16. A diode 31 is connected to complete the circuit for looping the core rods that are subsequently threaded through, for example, the holes 22, 23 and 24.

When the blanks are manufactured, a series having every combination or value of the interrogation code may be produced, and the response code, which is usually unknown at the time of manufacture can be cut on the blanks later. In addition, at the time of manufacture, slots to accommodate a conventional diode may be formed in each blank.

If the entry blanks loop different numbers of rods, their impedances and, hence, the impedances presented by the windings will vary. The response signal will in any case contain a certain amount of noise, spikes produced by leakage inductance, and stray capacity, for example. This noise is more difficult to suppress if the impedance of the response windings also varies.

This difficulty can be overcome by using permutation-type binary codes, that is codes in which the number of 1 bits in each word is constant, since each entry blank will then have the same impedance. To illustrate, four-bit binary codes are available which can represent decimal numbers zero to nine inclusive, each four-bit number having no more than two 1 bits.

If it is essential to use codes having larger variations in the number of 1 bits, extra holes may be made in the blanks and dummy rods used in these holes so that the same number of rods is looped by each entry blank.

Figure 5:
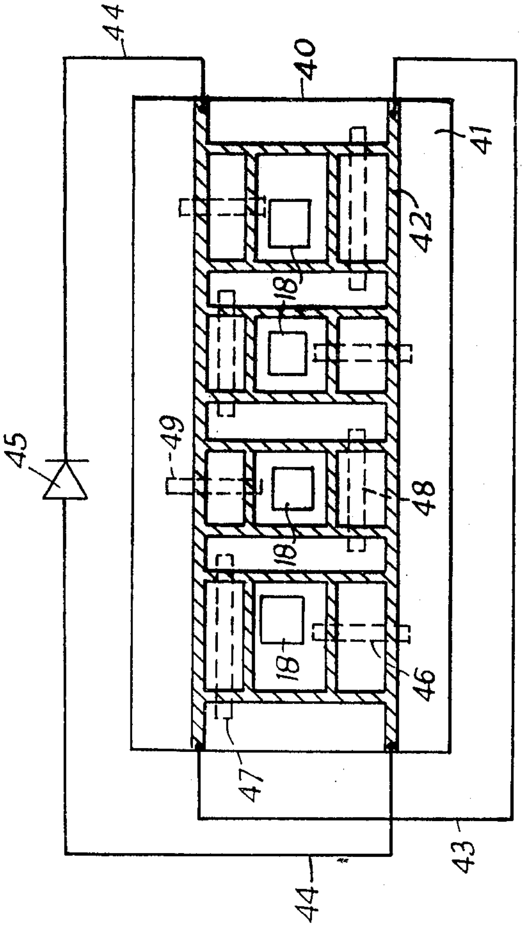
FIG. 5 shows a plan view of yet another embodiment of an entry blank.
Figure 6:
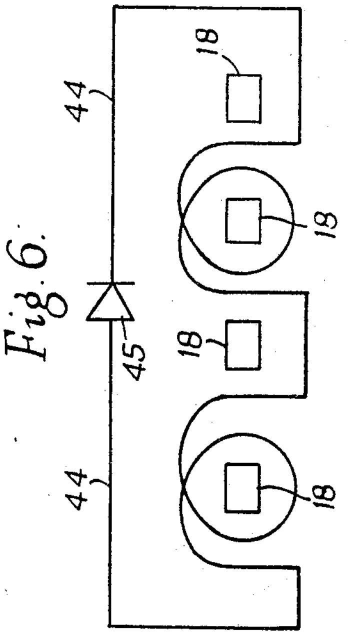
FIG. 6 shows an equivalent circuit to the circuit provided by the entry blank of FIG. 5.

FIGS. 5 and 6 illustrate another form that the entry blank may take. In this embodiment, an entry blank is provided with holes 18 for four rods instead of eight. It has been found that if the conductor of an entry blank loops cores in one direction corresponding to, for example, a 1 bit and in the other direction corresponding to a 0 bit, for example, the accuracy of the store readout is increased. The entry blank 40 allows looping in either a clockwise or counterclockwise direction, as viewed in the drawing. The blank 40 comprises a board 41 composed of an insulating material with a more complicated grid or pattern of conducting material 42 secured to one planar surface of the board 41. The pattern has a generally ladder-like configuration with a pair of conductors 43 and 44 electrically connected to the respective ends of each ladder. A diode 45 is included in the conductor 44 to provide unidirectional current flow through the circuit. The conductors 43 and 44 may also be carried by the blank on the same side as the material 42 or on the other side, and the diode 45 may be a thin film diode which is integral with the conductor 44, or accommodated in a slot formed in the board 41.

A 1 bit, for example, is encoded by making the cuts 46 and 47, shown in dashed lines, either through the conducting material only or also through the board 41. Making cuts 48 and 49, also shown in dashed lines, encodes a 0 bit, for example. Thus, reading from left to right, the entry blank shown holds the binary number "1010." The equivalent circuit is shown in FIG. 6 where two of the holes 18 are looped in one direction and two in the other direction.

The magnetic circuits and looping conductors need not be of the kinds described. For example, the shape of the magnetic circuits may have some other configuration than rectangular, the holes in the blanks may be in some other pattern, and the looping conductors could be rigid, but deformable wire loops, covered with insulating material. The wires could then be easily preformed to represent certain words and would retain their shape during storage on the rods or away from them.

The code of pulses applied to the interrogation pulses may correspond to the address of certain information, not only in the store but also some physical location such as that of a book in a library, and the code of resulting response pulses correspond to that information and also the classified contents of a book. In this case, it is useful to be able to apply a code of pulses to the response windings and thus obtain a code of output pulses from the interrogation windings. For instance, in this way the locations of all books in a library concerned with a certain subject can be obtained.

Figure 7:
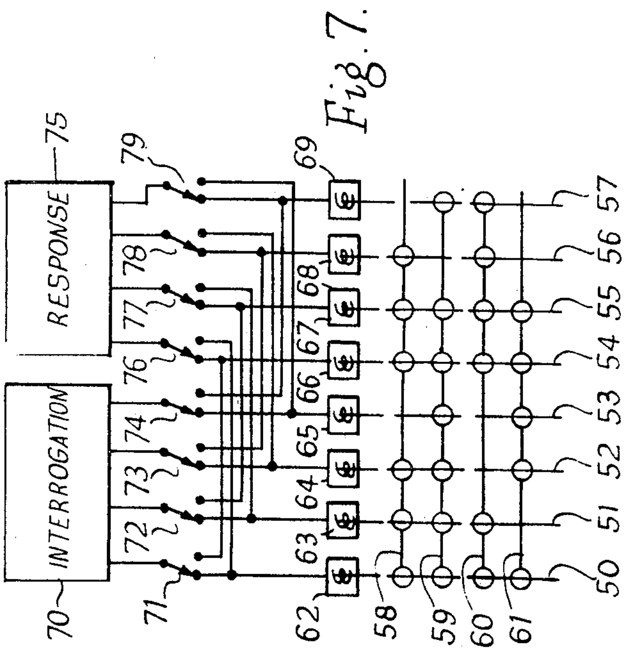
FIG. 7 is a block diagram of a system incorporating the permanent store of this invention and having the facility for reading out the contents of the store through either interrogation or response circuits.

A digital information storage system arranged as in FIG. 7 may be used for this purpose. In this figure, the rods are designated 50 to 57, the entry blanks 58 to 61, the interrogation windings 62 to 65, and the response windings 66 to 69. The windings and the entry blanks are shown schematically, with circles where the entry blanks loop rods. Interrogation pulses, from conventional circuits 70 for addressing the store, normally reach the windings 62 to 65 by way of switches 71 to 74. Pulses induced in the windings 66 to 69 normally reach conventional read circuits 75 by way of switches 76 to 79. If it is required to interrogate the response windings 66 to 69, and read from the interrogation windings 62 to 65, the switches 71 to 79 are operated to close all associated normally open contacts and to open all associated normally closed contacts. Simultaneously, in practice it is preferable to use diode or transistor circuits in place of the switches 71 to 79 to effect the alternate or reversible connection of the interrogation circuits 70 and the response circuits 75 to the two sets of coils 62 to 65 and 66 to 69, respectively.

The code applied to the response windings must contain pulses of both senses if several response windings are interrogated at the same time, for the reasons explained in connection with interrogating several interrogation windings at the same time. It may be useful to apply partial codes to the response windings, corresponding to wider fields than a full code, and obtain the corresponding addresses. For instance, books in a wide field could be found with the partial code and in a narrower field with the full code.

To illustrate, assume that the entry blanks 48 and 60 relate to similar subject matter. The most significant parts or bits of the binary information held by the blanks 58 and 60 are encoded in this system by the blanks 58 and 60 looping the three most significant order response rods 54, 55 and 56. Also, assume that the entry blanks 59 and 61 relate to different subject matter and the most significant bits or parts of the binary information held by the blanks 59 and 61 are encoded in the system by these blanks looping only the response rods 54 and 55. Thus, if flux pulses are induced in the rods 54 and 56 in one directional sense and in the rod 55 in an opposite directional sense, a current will be induced only in the entry blanks 58 and 60 which relate to similar subject matter. The full code of four digits is not used to select these blanks since flux is not induced in the rod 57.

Cross-referencing among several stores can be provided through the pulsing of the response windings to provide digital outputs at the interrogation windings. For example, if a code of pulses is applied to the response windings of one store, and the interrogation windings of this store are connected to the corresponding interrogation windings of another store, by way of an amplifier, then a code of digital pulses will be produced at the response windings of the second store. In this way the information in one store can be related to that in another. Again, a partial code may be used for interrogating the response windings of the first store and other relationships found.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A digital-information storage system, comprising a plurality of spaced cores of magnetic material; a plurality of electrical windings equal in number to the number of said cores, each of said cores carrying a corresponding one of said windings; certain of said electrical windings being allocated as interrogation windings, and others of said windings being allocated as response windings; a plurality of cards, each of said cards mounting conductors that electrically loop selected ones of said cores but not others of said cores to form respective closed and open electrical conductive paths around each of said cores according to the binary value of the information encoded in each card; interrogation means coupled to the interrogation windings for exciting the interrogation winding of at least one of said cores that is looped by a conductor, whereupon information is obtained from the system by inducing a current signal in a response winding of at least another core that is looped by the same conductor that loops the one core; said interrogation means including circuitry for passing currents in one of two directional senses through selected ones of said interrogation windings whereby certain of said conductors corresponding to desired items of binary information receive current; means coupled to the response winding of said another core and responsive to the current induced therein; a plurality of boards of electrical insulative material having a row of spaced-apart apertures arranged to accommodate individual ones of said cores, each of said boards being interposed between two cards; and means for selectively coupling said interrogation means and said response means to said interrogation and response windings, so that an address of an item of information stored by a card is obtainable by passing current through the response winding which corresponds to said address.

2. A blank for a permanent memory system comprising, a member of electrical insulating material having a row of apertures axtending therethrough and mounting an electrically conductive pattern, said pattern including a conductive loop about each aperture and at least two elongated electrical conductors extending along different sides of the row of apertures, the conductors being spaced from the conductive loops, plural, spaced apart electrically conductive strips extending laterally from each conductor toward one aperture for electrically connecting a portion of each loop to a different one of the conductors, and means for storing a binary value in the blank by open circuiting the plural strips extending from one of said conductors toward the one aperture and by open circuiting a loop portion and the other of said conductors between the other strips extending toward said one aperture.

3. A blank for a permanent digital information memory system comprising, a flat member of electrical insulating material having a row of apertures extending therethrough and mounting an electrically conductive pattern, said pattern including a conductive loop about each aperture and two elongated electrical conductors extending along different sides of the row of apertures, the conductors being spaced from the conductive loops, and two spaced apart, electrically conductive strips extending laterally from each conductor toward one aperture for electrically connecting a portion of each loop to a different one of the conductors, and means for storing a binary number in the blank by open circuiting the two strips extending from one of said conductors toward the one aperture and by open circuiting the loop portion and the other of said conductors in a region between the other strips extending toward said one aperture.

4. A permanent digital information memory system comprising, a plurality of binary number-storing blanks as claimed in claim 3 stacked such that said apertures are aligned, and further comprising, a plurality of magnetic cores mounted in different ones of the aligned apertures, and wherein a portion of one of said conductors and a portion of said loop on one side of a selected one of said apertures between two corresponding conductive strips are open-circuited and wherein the two conductive strips on an opposite side of said selected one of said apertures are open-circuited.

5. A blank as claimed in claim 3, which further comprises a first circuit connecting to one end of one of said conductors to the opposite end of the other of said conductors and a second circuit connecting the other two ends of said conductors.

6. A blank as claimed claim 5, wherein said second circuit includes a unidirectional current-conducting device.

References Cited

UNITED STATES PATENTS

| | | | |
|---|---|---|---|
| 3,234,529 | 2/1966 | Hsueh et al. | 340—174 |
| 3,339,184 | 8/1967 | Pick | 340—174 |
| 3,432,830 | 3/1969 | Owen et al. | 340—174 |

BERNARD KONICK, Primary Examiner

G. M. HOFFMAN, Assistant Examiner